United States Patent [19]

Meyer et al.

[11] 3,901,194

[45] Aug. 26, 1975

[54] APPARATUS FOR MIXING AND DISPENSING FEED TO ANIMALS

[76] Inventors: Jack G. Meyer, R.R. No. 3, Bluffton, Ind. 46714; Norman L. Haines, Rt. 2, Berne, Ind. 46711

[22] Filed: Mar. 14, 1974

[21] Appl. No.: 451,184

[52] U.S. Cl. ............ 119/53; 119/52 AF; 119/56 R; 119/63
[51] Int. Cl. ................................................ A01k 5/00
[58] Field of Search ......... 119/56 R, 59, 62, 63, 57, 119/52 B, 52 AF, 53, 51.12

[56] References Cited
UNITED STATES PATENTS

| | | | |
|---|---|---|---|
| 1,234,117 | 7/1917 | Barnes | 119/63 |
| 2,406,886 | 9/1946 | McBean | 119/56 R |
| 3,144,173 | 8/1964 | France et al. | 119/56 R X |
| 3,180,318 | 4/1965 | Fisher | 119/56 R |

*Primary Examiner*—Louis G. Mancene
*Assistant Examiner*—J. N. Eskovitz

[57] ABSTRACT

In an apparatus for mixing and distributing feed to animals, a plurality of side-by-side stalls have doors associated one with each cage and each door is simultaneously raisable and lowerable by a mechanical device. Adjustable amounts of feed are metered into a container one for each stall and each container is then actuated to discharge the feed into the stall (or cage) so that a controllable amount of feed is provided each animal in the correct composition and amount. Competition between animals such as normally occurs in sow-feeding is minimized and the correct amount and composition of feed is provided each sow or other animal to promote the most efficient and accurate feeding procedure. The stalls are of heavy durable sheet metal and tubular metal stock so as to be virtually indestructable by the sow or other animal.

5 Claims, 5 Drawing Figures

APPARATUS FOR MIXING AND DISPENSING FEED TO ANIMALS

BACKGROUND OF THE INVENTION

In a typical sow feeding arrangement, an open trough is used which is periodically filled and the sows are concurrently fed through such trough. This procedure promotes competition between animals, and results in uneven feeding, and irregular, noncontrollable feeding to each animal, thus preventing an accurate amount of feed distributed to each sow and interfering with their maturing rate. The procedure also results in damage to the livestock because of the destructive competition which frequently causes injury, malnutrition and even death to the livestock.

DESCRIPTION OF THE PRIOR ART

The prior art has proposed numerous automatic cage type feeding arrangements, particularly in the area of poultry, but thus far a practical cage or stall type method of feeding for other animals, such as sows, has either proved impractical or beyond realm of economic exploitation because of expensive components, servicing or other factors.

SUMMARY OF THE INVENTION

One of the principal objects of the present invention is to provide a new and improved sow feeding arrangement in which each sow is insured the proper composition and amount of feed without encountering competition for such feed between sows.

Another object of the invention is to provide a sow-feeding arrangement in which a single operator can arrange to provide ingress for the animals into the cages, one in each stall and once there, confined until the feeding is completed.

A still further object of the present invention is to provide a ready means for providing an adjustable amount of feed which can be easily and accurately provided for each stall depending upon the feed requirements and composition requirements for the animals thus insuring accurate and competitionfree feeding which will enhance the health standards of the animals and without producing injury thereto.

A still further object of the present invention is to provide an inexpensive but very durable feeding apparatus which is not prone to damage or require substantial servicing once in place and which can be adapted for many different kinds of animals and level of maturity of such animals.

Other objects and features of the present invention will become apparent from a consideration of the following description which proceeds by way of example with reference to a selected embodiment which is illustrative and by no means restrictive of the invention.

DRAWINGS

DETAILED DESCRIPTION OF AN ILLUSTRATIVE EMBODIMENT

Figure 1:
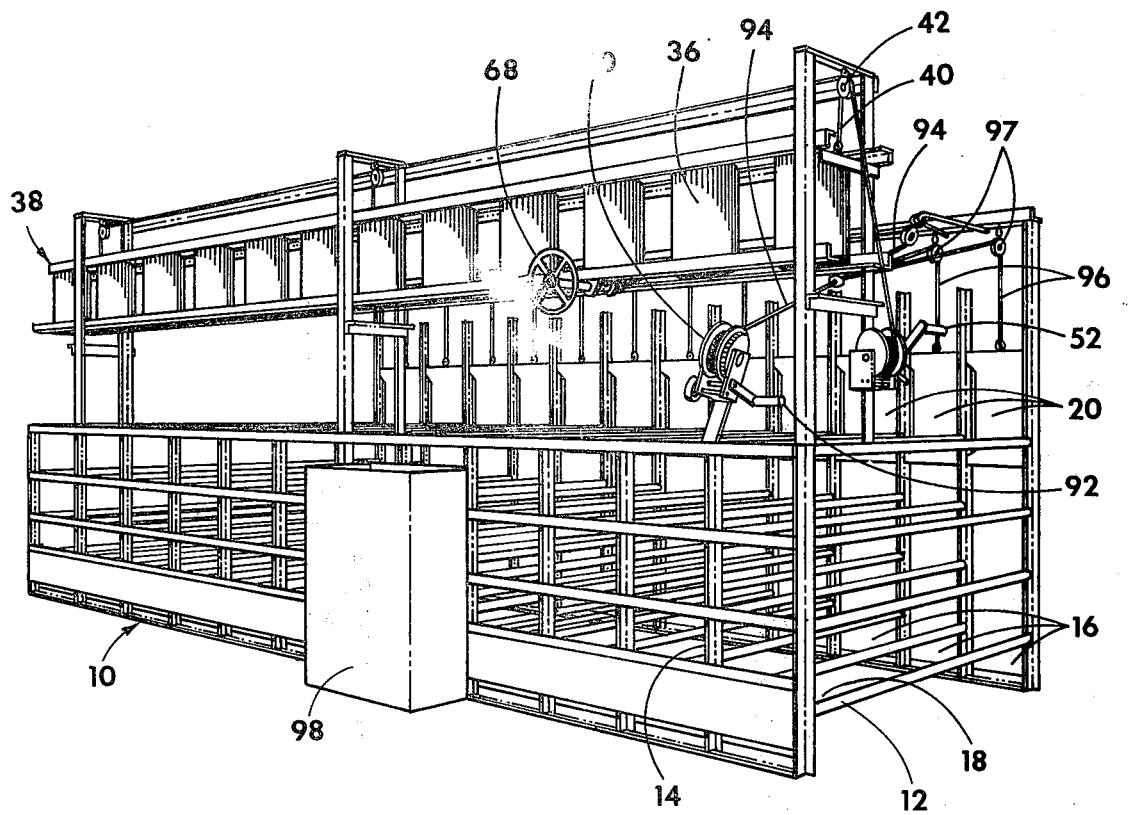
FIG. 1 is a perspective view of the apparatus illustrating the dispensing means, stalls, and viewed from the forward or feeding side of the apparatus.

Referring now to the drawings, the apparatus designated generally by reference numeral 10 consists of a framework of interconnected tubular members 12 in channels 14 which form a plurality of side-by-side stalls 16 each of which has its own feeding station 18 and door 20.

The doors, in a raised position permit the sows to enter, one into each of the stalls, and once entered, the doors 20 are lowered to hold the sows in the stall during the feeding and treatment procedure. In order to distribute the feed, there is provided an auger 24 having interior flights 26 which receive the feed from a hopper (not shown) so that the flights of the auger 24 will advance the feed uniformly along the length of the auger conduit 28. The forward movement of the feed is terminated in some suitable manner as by a sensor 30.

At spaced intervals along the length of the conduit 28 is an outlet sleeve 32 which fits within a drop pipe 34 extending within a feed cylinder 36. There is a feed cylinder 36 for each of the stalls and the spaced cylinders are carried on a horizontally extending bar 38. A cable 40 passing over a pulley 42 connected at 44 with bar 38 is adapted to raise and lower simultaneously all of the containers 36.

The cable 40 is connected to a winch 50 which is operated by crank 52 capable of raising and lowering the holder bar 38 and hence the containers 36 attached thereto.

The amount of feed which is dispensed to the cylinders is determined by the clearance from the open end 54 the drop pipe relatively to the bottom 56 of the container 36. Thus, when the open end 54 is close to the bottom 56 less feed will be dispensed than when the open end 54 is higher or a greater displacement from the bottom 56 of the container. Consequently, the cable 40 and winch are operated to control the vertical position of the bar 38 (and hence the attached containers 36) and by this means the amount of feed which is distributed to the respective stalls is readily adjusted.

Figure 3:
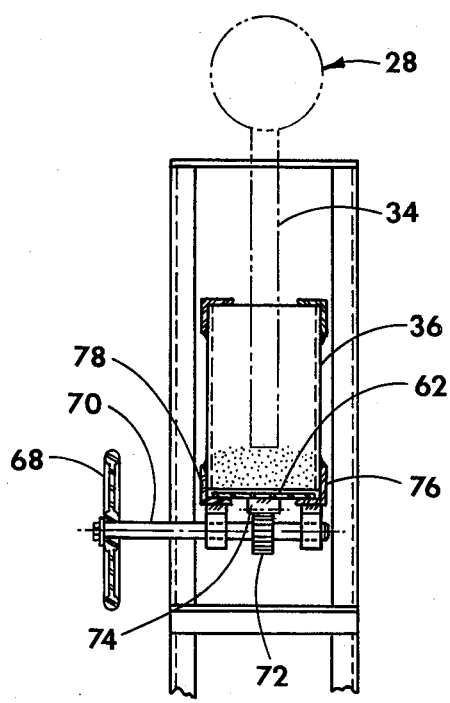
FIG. 3 is an enlarged sectional detail view of the adjusting and dispensing means; looking in the direction of the arrows 3—3 of FIG. 2.
Figure 4:
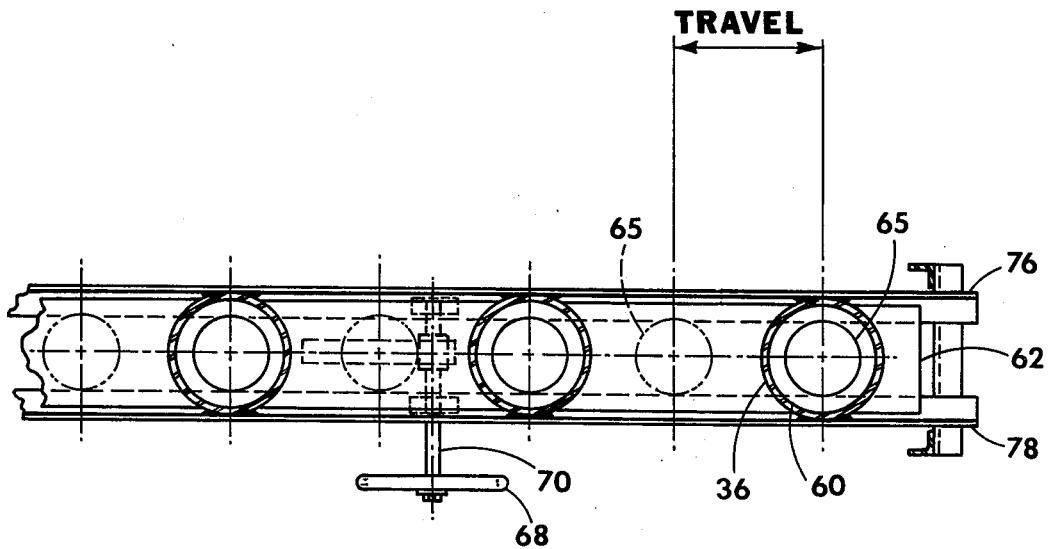
FIG. 4 is an enlarged sectional detail view looking in the direction of the arrows 4—4 of FIG. 2; and illustrating detail views of the dispensing apparatus for the individual stalls; and, FIG. 5 is a detail end view looking in from the right side of FIG. 1.
Figure 5:
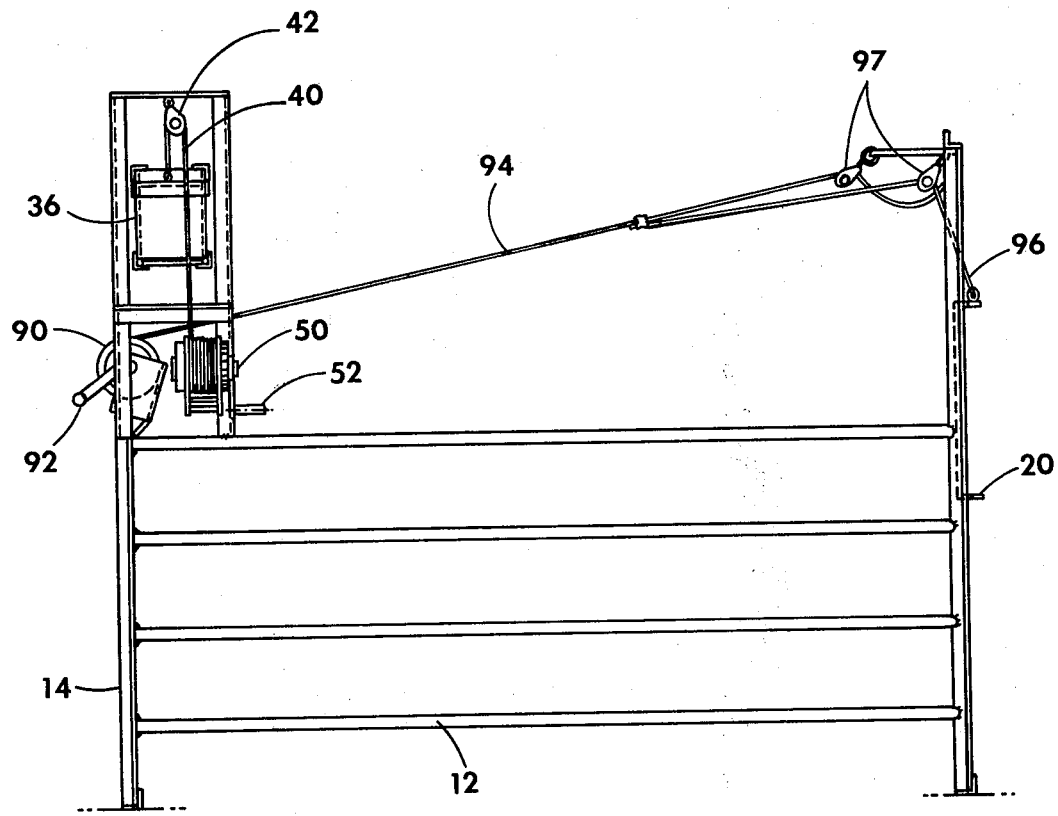

At the bottom of each container is an opening 60 (FIGS. 3, 4) which is normally covered by a bar 62. The bar 62 has openings 65 which can register with the complementary openings 60 at the bottom of the container when the bar 62 is horizontally displaced by a wheel or handle 68 which operates through a shaft 70 to operate pinion gears 72 meshing with a rack 74. The rack 74 is welded or otherwise secured to the bar 62 and the bar 62 rides or is slidingly supported on angles 76 and 78. The feed is dispensed by turning the handle 68 until the openings 65 in the bar 62 register with the openings 60 at the bottom of the containers 36; and, by reversing the direction of rotation of the wheel or handle 68 the discharge openings 60 at the bottom of the containers 36 are closed.

Figure 2:
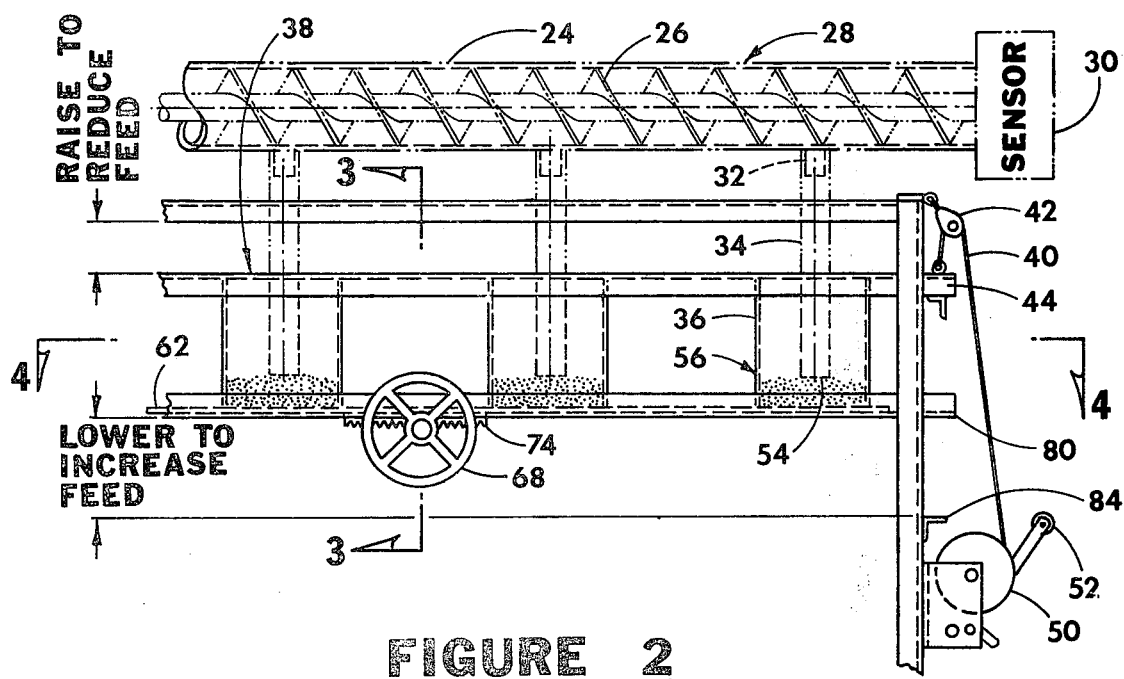
FIG. 2 is a longitudinal section view of the auger used for advancing the feed, and the dispensing means for the individual stalls.

Downward movement of the containers 36 and the associated dispensing structure is limited by contact of the ends 80 with cross member 84 (FIG. 2) which is rigidly secured to the framework.

A second winch 90 having a crank handle 92 and cable 94 is connected to a series of vertical cables 96 each connected to a respective one of said doors 20. The vertical cables pass through change direction pulleys 97 and are operatively connected to cable 94 so that turning of the crank 92 will cause the vertical cables 96 associated with each door to effect a lifting action on the doors and conversely when the crank is counterrotated the vertical cables 96 will provide lowering of the doors 20.

At the front of the unit is a bin 98 in which extra feed can be located and from which extra feed can be dispensed to the particular stall where there is a need for extra feeding of the animal contained therein. It should be noted also that individual quantities of water are dispensed to each stall by means of a trough (not shown) and which extends the horizontal length of the unit with watering facilities at each stall.

The unit as a whole is transportable or, can be assembled on site from the component parts or preassembled modules depending upon design preference. Once cables are passed through the pulleys and attached to the component parts, there is relatively little that can malfunction in the unit and servicing is relatively easy.

OPERATION

In operation, the winch 50 is first operated to determine the position of the containers 36 relatively to the ends of the drop pipes 34 in order to establish the amount of feed which will be dispensed to the respective stalls.

The feed composition is accurately and scientifically blended before being distributed from the auger 24 to the containers 36. The essential accomplishment is that an amount of feed is accurately established and is accurately dispensed individually to each stall so that the animal therein will be insured of obtaining the correct amount and composition of food, augmented, if need be, from the food bin 98 from which individual servings can be had.

Watering the stock is by means of a trough (not shown) which extends the length of the unit.

The feeding process proceeds without competition between the respective animals, and the animals are always insured of the correct amount of feed by first adjusting the winch 50. After the adjustment has taken place, the winch 90 is operated and through the cable 94 and the respective vertical cables 96 operatively connected to the cable 94, and a respective one of the doors 20, the doors 20 are raised and the sows will enter the cages 18. The cages 20 are next closed by lowering the doors 20 by means of counterrotating the handle 92. The animals are then held within the stalls until the feeding is completed. Feeding occurs by operating the handle 68 and the stem 70 operates the pinion gear 72 thus displacing the open-close bar 74 causing the openings 65 in the bar 74 to register with openings 60 in the bottom of the containers and dropping the feed from a respective container into its associated stall.

After the feed is dispensed the handle 68 is counterrotated and the opening in the bottom of each container is again covered in preparation for the next feeding.

While the animals are held within the stall they are confined without injury to themselves but the structure is sufficiently rigid and strong so that it cannot be damaged or misshaped by the sows. While the sows are so confined, medication can be administered by liquid antibiotics or by interveneous injection. This is a convenient time to so medicate the animals since the animals are confined and are relatively immobile to facilitate such medication.

After the feeding is completed the individual doors 20 are raised and the animals withdraw voluntarily and the process can then be completed for the next group of animals.

A substantial advantage of the present invention is that a single operator can conveniently feed and medicate a substantial quantity of animals and such feeding can occur in a scientific and accurate manner with each animal receiving its prescribed quantity of food.

One of the substantial advantages of the present invention is the work saving that results from a single operator being able to feed, medicate and water a substantial number of animals and to do so in an accurate and quick manner. A further advantage is that the structural members are relatively rigid and themselves are unprone to damage and can produce no damage to any of the animals during the feeding process. Feeding progresses with each animals assured of its correct quantity of feed first of all by the metering and second by any feed supplement that is indicated on a per animal basis.

Although the present invention has been illustrated and described in connection with a few selected example embodiments, it will be understood that these are illustrative of the invention and are by no means restrictive thereof. It is reasonably to be expected that those skilled in this art can make numerous revisions and adaptations of the invention and it is intended that such revisions and adaptations will be included within the scope of the following claims as equivalents of the invention.

What is claimed is:

1. In a hog feeding apparatus, a plurality of in-row stalls wherein said hogs are held in caged position at least on three sides and forming a unitary reinforced structure, a vertically raisable and lowerable door associated one with each of said stalls and adapted to provide ingress and egress for animals to said stalls, a manually operated winch having a force transmitting connection to a respective one of said doors, whereby such doors are selectively raised and lowered to receive an animal one in each of said stalls, metering means for receiving an adjusted amount of feed and associated one with each of said stalls, and controllable discharge means for effecting a discharge of the predetermined amount of feed in measured quantity to a respective one of said stalls while said hogs are held one within an associated stall.

2. The construction in accordance with claim 1 including adjustable means for controlling feed discharged in to the stall having a vertically movable carrier, a container one for a respective stall and received on said carrier, means extending into each container by an amount determinative of the feed discharged therein, said discharge means being associated with said container and operable to effect simultaneous discharge of the measured quantity of feed from a respective container into its associated stall.

3. The construction in accordance with claim 1 wherein said discharge means comprises a horizontal cover adapted to form a shield over a vertical discharge opening at least one in each of said containers, and rack-and-pinion means for producing lateral displacement of said discharge to uncover said openings whereby the measured amount of feed in each said container is vertically discharged into an associated stall.

4. The construction in accordance with claim 1 including a feed system having an auger and chute for receiving said auger to distribute the feed in a horizontal sense, a discharge channel from said horizontal channel adapted to open into a respective one of said containers, and means for adjusting the vertical position of said container relatively to said discharge.

5. The construction in accordance with claim 1 wherein said stalls are constructed of tubular members forming a series of in-row stalls, and a central feed station carried by said unitary structure and adapted to receive additional feed from which such additional feed can be manually distributed to the animals in a respective one of said stalls.

* * * * *